United States Patent

[11] 3,529,512

[72] Inventor David L. Jones, Jr.
Dayton, Ohio
[21] Appl. No. 751,188
[22] Filed Aug. 8, 1968
[45] Patented Sept. 22, 1970
[73] Assignee General Motors Corporation
Detroit, Michigan
a corporation of Delaware

[54] HYDRAULIC WIPING SYSTEM
3 Claims, 7 Drawing Figs.
[52] U.S. Cl................................................. 91/219,
91/291, 91/300, 91/321
[51] Int. Cl...................................................... F01l 31/00,
F01l 25/06, F01b 7/18
[50] Field of Search............................................. 91/219,
291, 300, 321

[56] References Cited
UNITED STATES PATENTS
3,190,184 6/1965 Carpenter..................... 91/219
3,301,137 1/1967 D'Alba et al.................. 91/219

Primary Examiner—Paul E. Maslousky
Attorneys—W.E. Finken and W.A. Schuetz

ABSTRACT: In a preferred form, an hydraulically operated windshield wiper system which is operable to either effect continuous operation of a windshield wiper or to effect intermittent cyclic operation of the windshield wiper with intervening dwell periods is disclosed. The wiper system includes a wiper motor having a cylinder and a reciprocable piston in the cylinder and which divides the cylinder into opposed chambers and has unequal areas exposed to the chambers, a manual control valve means movable between an "off" position, a first range of "on" positions in which it effects continuous operation of the windshield wiper and a second range of "on" positions in which it effects intermittent cyclic operation of the windshield wiper, and with the manual control valve means being operable to continuously communicate a source of hydraulic fluid under pressure to the motor chamber exposed to the smaller piston area to continuously pressurize the same.

HYDRAULIC WIPING SYSTEM

The present invention relates to an hydraulically operated windshield wiper system, and in particular to an hydraulically operated windshield wiper system which is selectively operable to either effect continuous operation of the wiper or to effect intermittent cyclic operation of the wiper with intervening dwell periods.

U.S. Pat. No. 3,190,184 discloses a hydraulically operated windshield wiper system for effecting continuous operation of a windshield wiper for wiping a windshield of a vehicle. This system utilized a manual control valve means for controlling the speed of the wiper which was independent of a pressure regulating valve for regulating the pressure potential from a hydraulic source. This system included a wiper motor having a differential area piston which was continuously pressurized on its rod end side when the manual control valve means was moved to an on position and a reversing valve means controlled by movement of the piston to alternately subject the head end side of the piston to pressure and drain to cause the piston to be reciprocated. The manual control valve means was also operable, when moved to an off position, to interrupt operation of the wiper motor and to effect movement of the motor piston to a parked position beyond its normal inboard stroke position and thereby effect movement of the wiper to a depressed parked position.

The advantages achieved by the hydraulic windshield wiper system of U.S. Pat. No. 3,190,184 was that by having the speed control independent of the pressure regulating means and by continuously pressurizing the rod end of the motor chamber and alternately connecting the head end to pressure and drain, wiper blade chatter during slow speed operation was prevented or minimized. Another advantage of this system was that leakage across the motor piston, unless extensive, would not seriously impair operation of the wiper motor.

The present invention is an improvement over the hydraulic wiper system disclosed in U.S. Pat. No. 3,190,184 in that it incorporates an intermittent cyclic mode of operation, commonly referred to as a pulse mode of operation, in addition to a continuous mode of operation and in a manner such that essentially all of the advantages of the hydraulic wiper system during continuous operation are retained.

This is achieved, in accordance with the provisions of the present invention, by providing a pulse control means for controlling communication between the reversing valve means and the wiper motor, the pulse control means being operable to continuously communicate the reversing valve means with the head end chamber of the wiper motor when the manual control valve means is positioned for continuous operation and being operable to intermittently communicate the reversing valve means with the head end chamber of the windshield motor to intermittently effect reciprocation of the piston when the manual control valve means is positioned for pulse operation. The pulse control means, in the preferred embodiment, includes a loiter valve means for controlling communication between the wiper motor and the reversing valve means and a delay valve means for controlling operation of the loiter valve means.

The present invention further resides in various novel constructions and arrangement of parts, and further objects novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

Figure 1:
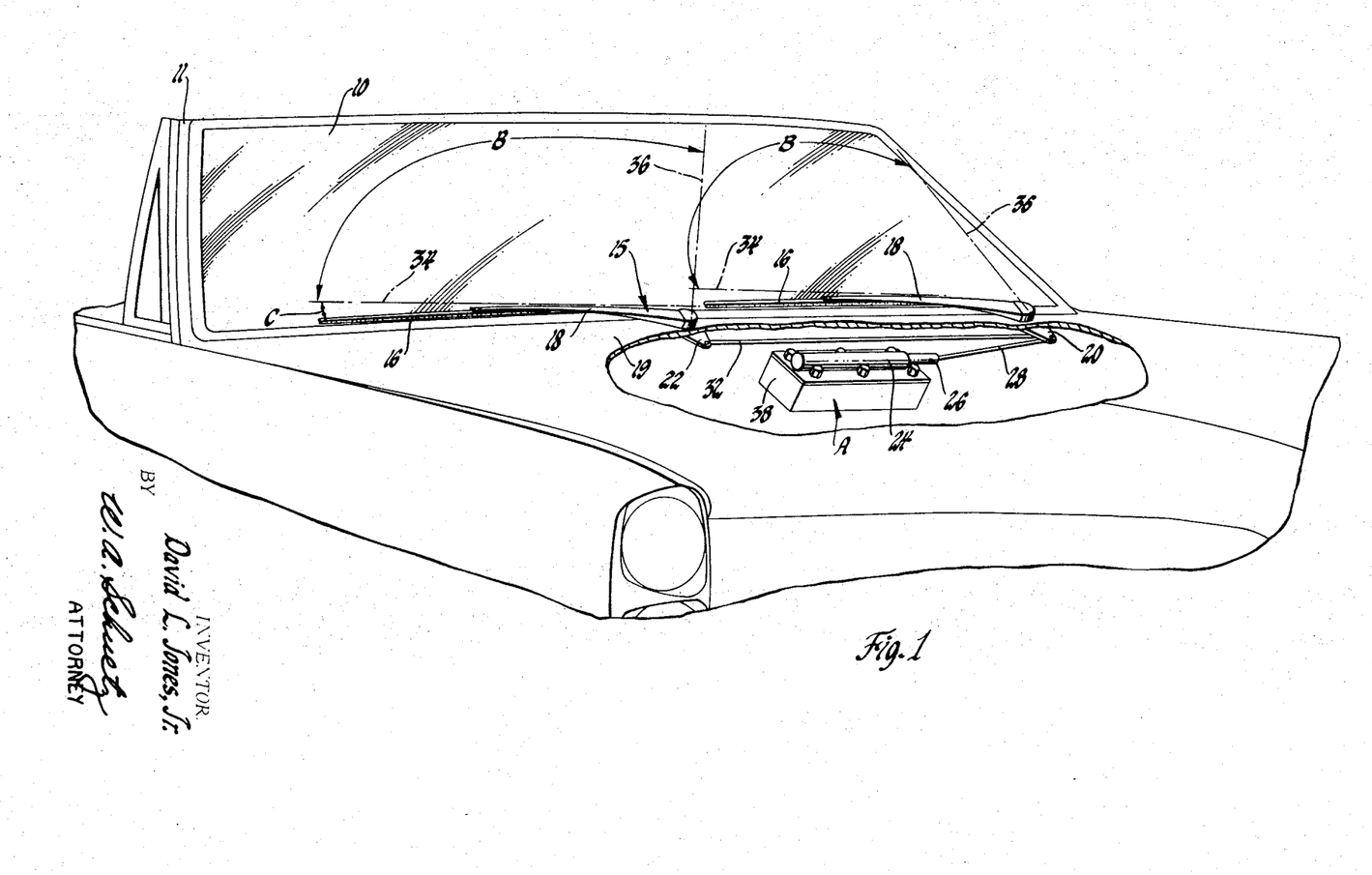
FIG. 1 is a fragmentary front elevational view of a vehicle embodying the hydraulically operated windshield cleaning system of the present invention.

As representing a preferred embodiment of the present invention, FIG. 1 of the drawings shows a hydraulically operated windshield wiping system A for cleaning a windshield 10 of an automotive vehicle 11. The windshield wiper system A includes a pair of spaced wipers 15 which, in the illustrated embodiment, are movable in tandem or phase across the outer surface of the windshield 10, the wipers 15 comprising wiper blades 16 carried by wiper arms 18 having spring hinge connected inner and outer sections. The wiper arms 18 are drivingly connected to drive pivots (not shown), which project through the vehicle cowl 19, the rightmost pivot shaft having a substantially triangular drive arm 20 fixed thereto and the leftmost pivot shaft having drive arm 22 fixed thereto. A wiper motor 24 is suitably attached to the vehicle 11 beneath its cowl 19, the wiper motor 24 being of the reciprocating type and having a piston rod 26 pivotally connected at its outer end to one end of a drive link 28. The drive link 28 is pivotally connected to the lower end of the triangular drive arm 20 for imparting oscillatory movement to the rightmost wiper 15, the drive arm 20 in turn being connected to the drive arm 22 by a second link 32 so as to drive the leftmost wiper 15 in synchronism with the rightmost wiper 15.

The motor 24 is operable to oscillate the wipers 15 throughout a running stroke having an angle B between predetermined inboard stroke end positions 34 and outboard stroke end positions 36. In addition the wiper motor 24, in the preferred embodiment, is operable to move the wipers 15 beyond their normal inboard stroke positions 34 to depressed parked positions through an angle C. The wiper motor 24 is part of a hydraulic actuating system for oscillating the wipers 15, the various component parts of the hydraulic actuating system being contained in a housing 38 suitably secured to the wiper motor 24 and to the vehicle 11 beneath its cowl 19.

The hydraulic actuating system can be selectively actuated to either effect continuous operation of the windshield wipers 15 or to effect pulse or intermittent cyclic operation of the windshield wipers 15 with intervening dwell periods.

The hydraulic actuating system broadly comprises a pressure regulating valve means 50 for regulating the pressure potential of the hydraulic fluid from a source; the wiper motor 24 which includes a cylinder 52 and a reciprocable piston 54 disposed in the cylinder 52 and connected to the piston rod 26, the piston 54 dividing the cylinder 52 into head end chamber 56 and a rod end chamber 58; a manual control valve means 60 which is movable between an off position in which the wipers 15 are in their parked position, a first range of "on" positions in which it effects continuous operation of the windshield wipers 15 and a second range of "on" positions in which it effects intermittent cyclic operation of the windshield wipers 15, the manual control valve means 60 being operable to communicate the hydraulic pressure from the pressure regulating valve means 50 to the rod end chamber 58 of the wiper motor 24 to continuously pressurize the same when in either of its positions; and a reversing valve means 65 controlled by movement of the piston 54 of the wiper motor 24 to alternately subject the head end chamber 56 of the wiper motor 24 to pressure and drain to cause the piston 54 to be reciprocated through its cycle of operation.

The hydraulic actuating system broadly also includes a second or pulse control means 70 for controlling communication between the reversing valve means 65 and the wiper motor 24, the pulse control means being operable to continuously communicate the reversing valve means 65 with the head end chamber 56 of the wiper motor 24 when the manual control valve means 60 is in its first range of "on" positions to cause the piston 54 to be continuously reciprocated and the wipers 15 to be continuously operated, and being operable to intermittently communicate the reversing valve means 65 with the head end chamber 56 of the wiper motor 24 to intermittently effect reciprocation of the piston 54 through a cycle of operation when the manual control valve means 60 is moved to its second range of "on" positions.

Figure 2:
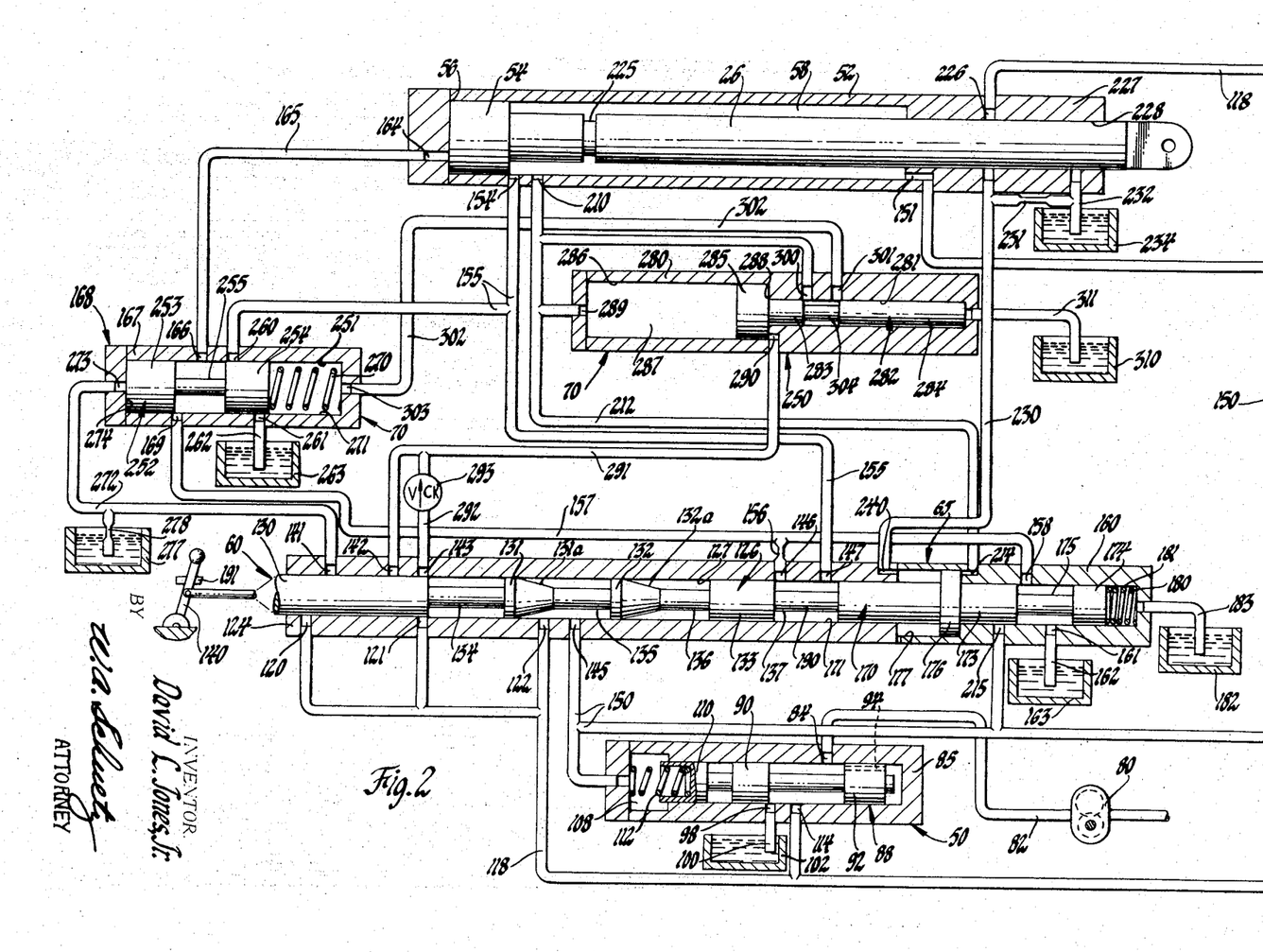
FIG. 2 is a schematic diagram of the hydraulic control system of the present invention and showing the relative positions of the parts when the wipers are in their parked positions.

Referring to FIG. 2, the pressure regulating valve means 50 is operable to regulate the pressure potential applied to the hydraulic actuating system from a source of hydraulic fluid under pressure, such as the excess, or bypass flow produced by a vehicle driven accessory pump 80, which may be the power steering pump. In one of the known types of power steering systems including an open center valve, the metered flow from the pump 80 is diverted to an exhaust port of the power steering control valve. In the illustrated embodiment, the exhaust port of the power steering control valve is communicated via a conduit 82 to an input port 84 in a cylinder or housing 85 of the pressure regulating valve means 50.

The pressure regulating valve means 50 comprises a reciprocable valve spool 88 slidably disposed within a bore 89 of the housing 85. The valve spool 88 has a pair of spaced lands 90 and 92 and with the land 92 having an axial passage 94 therethrough to permit the hydraulic fluid to flow to the right side of the land 92 for biasing the valve spool 88 toward the left. The land 90 controls communication between the pressurized hydraulic fluid and a pressure relief port 98 which is connected via conduit 100 to a sump or reservoir 102. The inlet of the pump 80 is also suitably connected to the reservoir 102.

The pressure regulating valve means 50 also includes a servo chamber 108 to which a piston head 110 integral with the valve spool 88 is exposed. A compression spring 112 having one end in abutting engagement with the head of the piston 110 and its other end in abutting engagement with the left end of the valve housing 85 functions to bias the valve spool 88 toward the right. When the wiper motor 24 is not in use the spring 112 and the pressure of the fluid in the servo chamber 108, which pressure is less than the pressure of the supply fluid, since the flow to the chamber 108 is throttled by the manual control valve means 60, determines a relief setting of the pressure regulating valve means 50, since it is only the spring 112 and fluid pressure in servo chamber 108 which opposes movement of the valve spool 88 toward the left. This maintains a minimum pressure at an outlet port 114 of the pressure regulator valve means 50. The outlet port 114 of the pressure regulating valve means 50 is connected via conduit means 118 to three spaced apart inlet ports 120, 121, and 122 in a housing 124 of the manual control valve means 60.

The manual control valve means 60 comprises a valve spool or member 126 slidably received within a cylindrical bore 127 in the housing 124. The valve spool 126 is a one piece member having four spaced equal diameter lands 130—133, adjacent ones of the lands being integrally connected with each other by reduced diameter or neck portions which define with the housing grooves 134—137. The lands 131 and 132 respectively include linearly tapered portions 131a and 132a for the purpose of throttling the flow of hydraulic fluid, as will hereinafter become more fully apparent. The left end of the valve spool 126 is connected to a manually operable lever 140, the lever 140 being suitably located in the passenger compartment of the vehicle so as to be readily manipulatable by the operator thereof.

Figure 3:
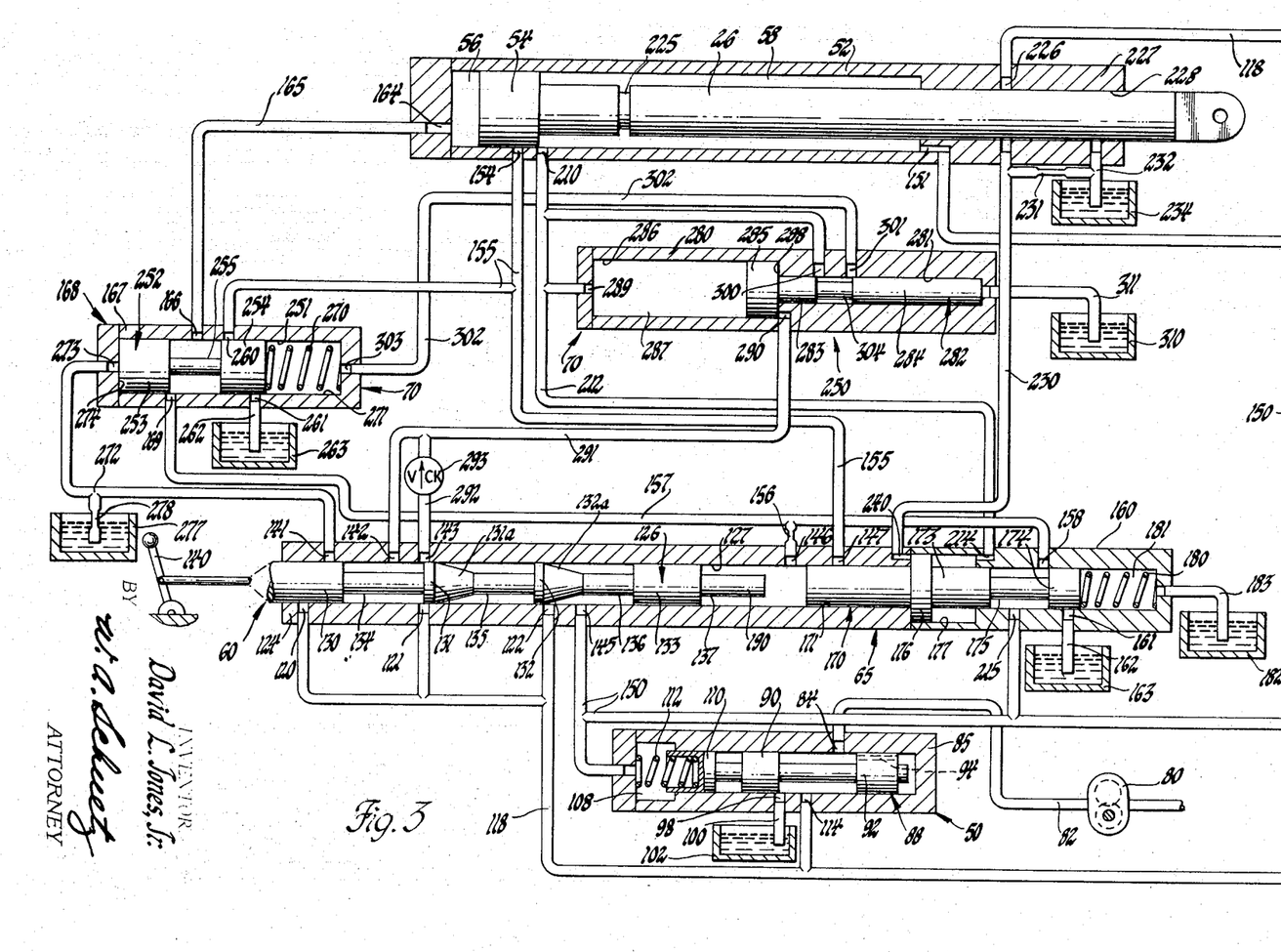
FIG. 3 is a schematic view similar to FIG. 2 and showing the relative position of the parts when the wipers are in their inboard positions.
Figure 5:
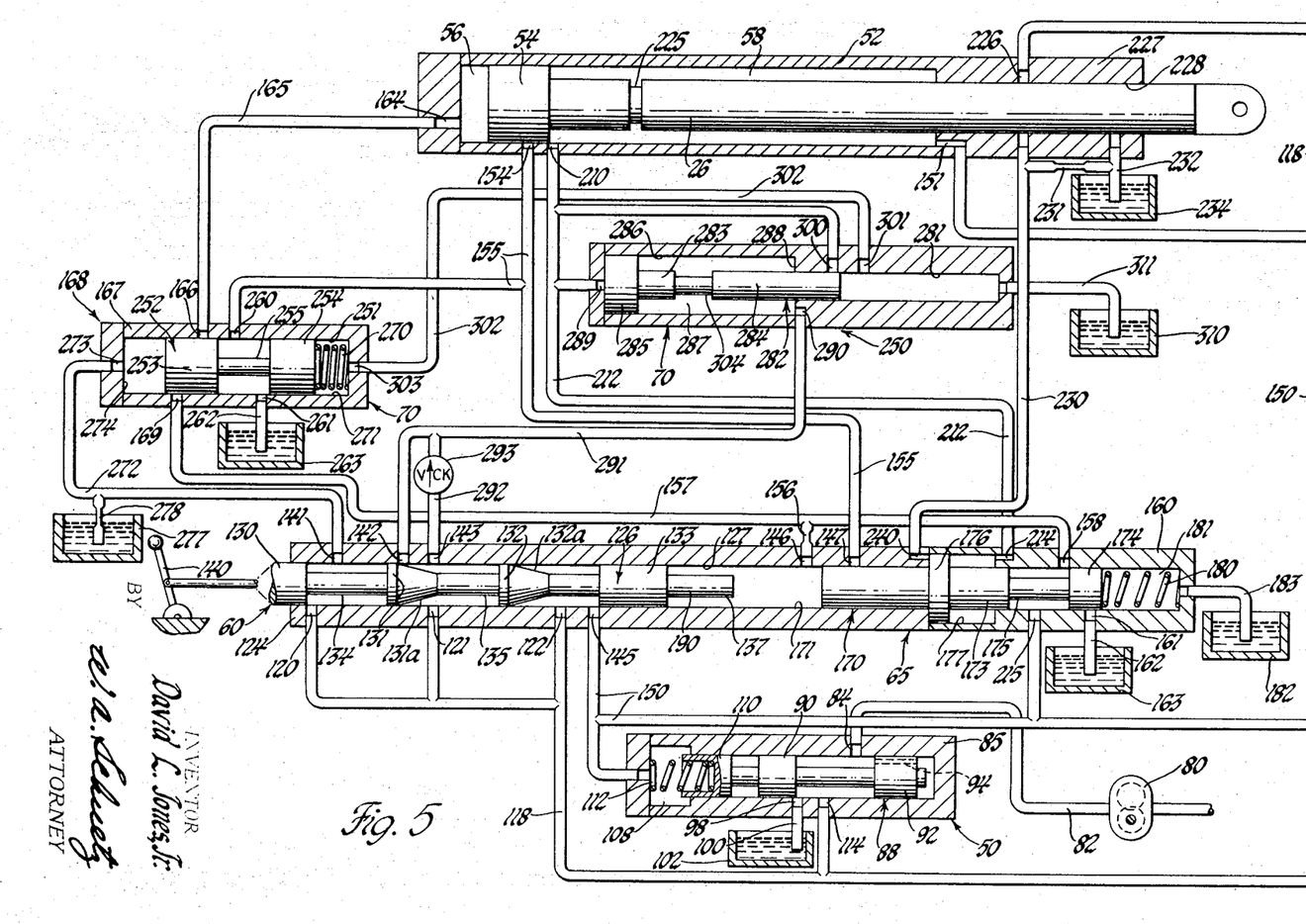
FIG. 5 is a schematic view similar to FIG. 3 and showing the relative position of the parts during intermittent cyclic operation at the start of the intervening dwell period.

The valve spool 126 of the control valve means 60 is movable in response to the operator manually manipulating the lever 140 between an off position, as shown in FIG. 2, in which it is effective to hold the wipers 15 in their parked position and either a first range of "on" positions, as shown in FIG. 3, in which it effects a continuous mode of operation of the wipers 15 or a second range of "on" positions, as shown in FIG. 5, in which it effects a pulse mode of operation for the wipers 15. As shown in FIG. 2, when the control valve means is in its off position, the valve spool 126 is positioned relative to the housing 124 such that the land 130 thereof blocks communication between the inlet port 120 and an outlet port 141 in the housing 124 and blocks communication between the inlet port 121 and spaced ports 142 and 143 in the housing 124. Also, when in this position the land 131 of the valve spool 126 provides for restricted communication between the inlet port 122 via groove 135 to an outlet port 145 and the land 133 is positioned such that the groove 137 communicates ports 146 and 147 in the housing 124.

When the valve spool 126 of the control valve means 60 is moved toward the left from its off position, as shown in FIG. 2, to a position in its first range of "on" positions, as shown in FIG. 3, the valve spool 126 is positioned relative to the housing 124 such that tapered portion 132a of the land 132 is located adjacent the ports 122 and 145 to throttle the flow of hydraulic fluid from the port 122 to the port 145. Also, in this position, the groove 134 is positioned so as to communicate the inlet port 121 with the ports 142 and 143, but the land 130 still blocks communication between the inlet port 120 and the outlet port 141.

When the valve spool 126 of the control valve means 60 is moved further toward the left to a position in its second range of "on" positions, as shown in FIG. 5, the valve spool 126 is in a position relative to the housing 124 such that the groove 134 between the lands 130 and 131 communicates the inlet port 120 with the outlet port 141 and the tapered portion 131a of the land 131 is positioned such that it throttles the flow between the inlet port 121 and the ports 142 and 143. Also, in this position the land 132 is positioned to the left of the inlet port 122 such that the groove 136 between the lands 132 and 133 provides for unthrottled or unrestricted communication between the inlet port 122 and the outlet port 145.

It should be noted at this point that the control valve means 60 functions to continuously pressurize the rod end chamber 58 of the wiper motor 24 irrespective of the position in which the valve spool 126 of the control valve means 60 is moved. This is because the outlet port 145 is in at least restricted communication with the inlet port 122 at all times and serves to direct the flow of hydraulic fluid through a conduit means 150 to an inlet port 151 at the right end of the cylinder 52. Pressurization of the rod end chamber 58 tends to bias the piston 54 toward the left and when the control valve means 60 is in its off position serves to biasingly hold the piston 54 in its extreme left position, as shown in FIG. 2. When the piston 54 is in this position, the piston rod 26 is in its maximum retracted position and serves to hold the wipers 15 in their parked position, as shown in FIG 1.

When the control valve means 60 is in its off position, as shown in FIG. 2, the flow of hydraulic fluid is from inlet port 122 groove 135, outlet port 145, conduit 150, inlet port 151 of the cylinder 52, the rod end chamber 58 of the wiper motor 24, an outlet port 154 in the cylinder 52 adjacent the left end thereof, conduit 155, port 147 in the housing 124 of the manual control valve means 60, groove 137, port 146, restriction 156, conduit 157, port 158 in a housing 160 of the reversing valve means 65, port 161 in the housing 160, conduit 162 to sump 163. The sump 163 in turn is connected to the sump 102. The restriction 156 serves to provide a back pressure on the hydraulic fluid so that the rod end chamber 58 is at all times pressurized to hold the piston member 54 in its extreme left or parked position. The head end chamber 56 of the wiper motor 24 is connected to drain to the sump 163 when the manual control valve means 60 is in its off position. This drain connection is from port 164 at the left end of the cylinder 52, conduit 165, port 166 in a housing or cylinder 167 of a loiter valve means 168 of the pulse control means 70, port 169 in the housing 167 conduit 157, port 158 in housing 160 of the reversing valve means 65, port 161, conduit 162 to the sump 163.

Figure 4:
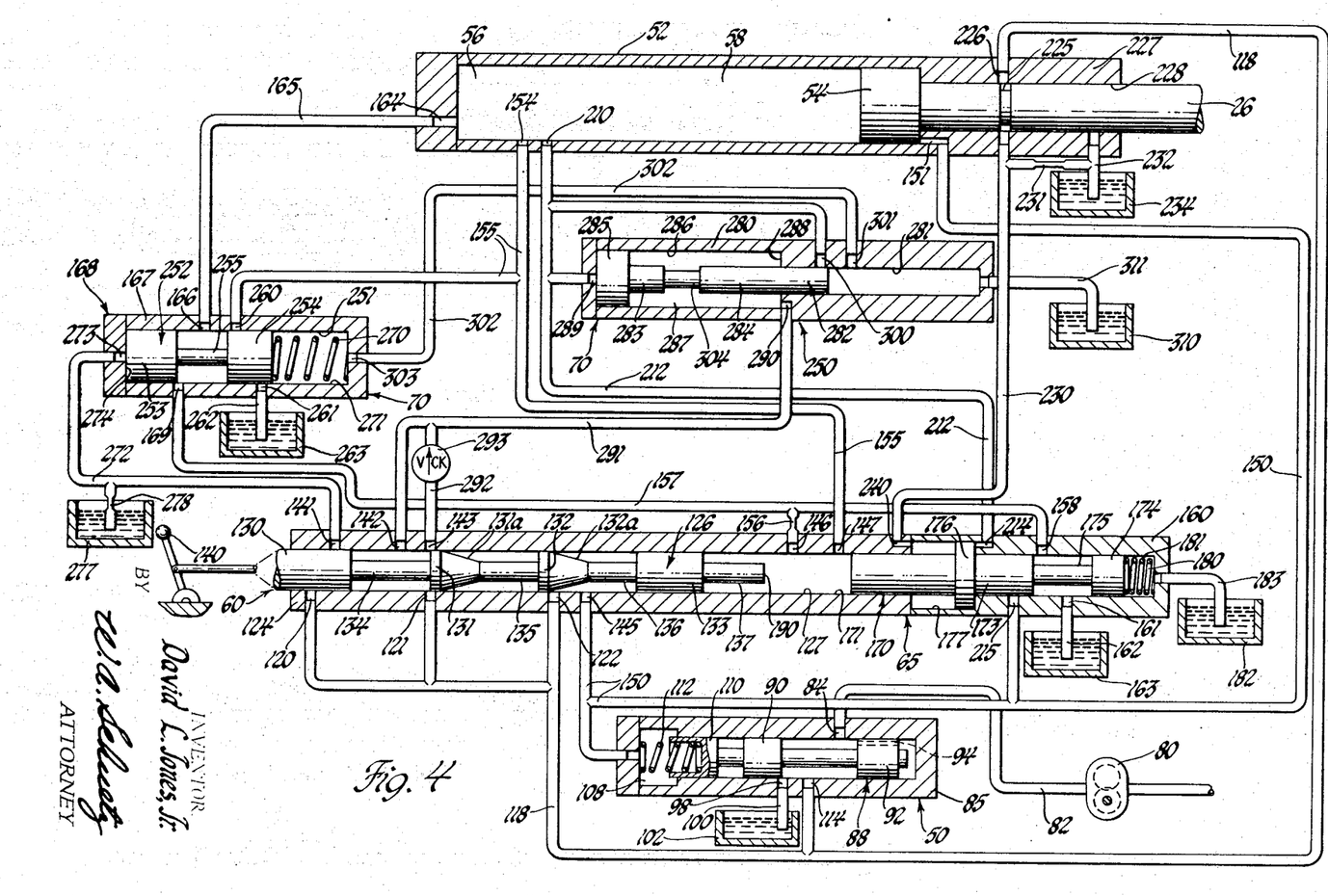
FIG. 4 is a schematic view similar to FIG. 3 and showing the relative positions of the parts when the wipers are in their outboard positions.

The piston 54 is adapted to be moved from its parked position, as shown in FIG. 2, to a first or inboard position, as shown in FIG. 3, and be reciprocated back and forth between its inboard position and a second or outboard position, as shown in FIG. 4, when the valve spool 126 of the control valve means 60 is moved to a position in its first range of "on" positions. The piston 54 when moved from its parked position toward its inboard position causes the piston rod 26 to be extended somewhat which in turn causes the wipers 15 to be moved from their parked position toward their inboard position 34. The piston 54 when moved from its inboard position to its outboard position, as respectively shown in FIGS. 3 and 4, causes the piston rod 26 to effect movement of the wipers from their inboard position 34 to their outboard position 36, as shown in FIG. 1. The piston 54 when moved from its outboard position to its inboard position causes the piston rod 26 to be retracted which in turn causes the wipers 15 to be moved from their outboard position 36 to their inboard position 34. Movement of the piston 54 from its inboard position to its outboard position and back to its inboard position constitutes a single cycle of operation of the wiper motor 24.

The piston 54 is adapted to be reciprocated through its cycles of operation by alternately subjecting the head end chamber 56 to pressure and drain. Since the area of the piston 54 exposed to the head end chamber 56 is greater than the area of the piston 54 exposed to the rod end chamber 58, it should be apparent that when the head end chamber 56 is subjected to hydraulic pressure that the piston 54 is caused to be moved toward the right from its inboard position toward its outboard position. Likewise when the head end chamber 56 is subjected to drain, the continuously pressurized rod end chamber 58 causes the piston 54 to be reciprocated from its outboard position toward its inboard position.

The head end chamber 56 of the wiper motor 24 is alternately connected to pressure and drain by the reversing valve means 65. The reversing valve means 65 comprises a valve spool 170 slidably received within the bore 171 in the housing 160 and the aligned bore 127 in the housing 124, the housings 124 and 160 being suitably connected to each other. The valve spool 170 includes first and second spaced lands 173 and 174 which are interconnected by a reduced neck or diameter portion to define an annular groove 175. The land 173 intermediate its ends has an enlarged diameter piston or piston portion 176 which is slidably received in an enlarged diameter bore portion 177 in the housing 160.

The valve spool 170 is biased toward the left by a compression spring 180 disposed in a chamber 181 at the right end of the land 174. The spring 180 has one end in abutting engagement with the right end of the land 174 and its other end in abutting engagement with the adjacent end of the housing 160. The chamber 181 is connected with a sump 182 via a conduit 183, the sump 182 in turn being connected to the sump 102.

The valve spool 170 of the reversing valve means 65 is held and retained in its extreme right position, as viewed in FIG. 2, in which it is inoperable to effect movement of the piston 54 of the wiper motor 24 by the control valve means 60 when the latter is in its off position. To this end, the valve spool 126 of the control valve means 60 has a rod portion 190 projecting forwardly of the land 133 and which abuttingly engages the left end of the land 173 of the valve spool 170 to hold the latter in opposition to the biasing force of the compression spring 180 against movement toward the left. A suitable releasable detent means 191 engageable with the manual control lever 140 is provided to releasably latch the control lever 140 in its off position and hence, prevent movement of the valve spool 126 toward the left by the compression spring 180.

When the manual control valve means 60 is in its off position and the valve spool 170 of the reversing valve means 65 is in its extreme right position, as viewed in FIG. 2, the head end chamber 56 of the wiper motor 24 is connected to drain to the sump 163 through ports 158 and 161. Also when the manual control valve means 60 is in its off position and the piston 54 is in its parked position, the right side of the piston 176 is in communication with the rod end chamber 58 of the wiper motor 24. This communication is through a port 210 in the cylinder 52, conduit 212, and port 214 in the housing 160 which is exposed to the right side of the piston 176.

The valve spool 170 is adapted to be moved from its extreme right position, as viewed in FIG. 2, to an extreme left position, as viewed in FIG. 3, when the manual control valve means 60 is moved from its off position to either of its ranges of "on" positions and thereafter be reciprocated back and forth between its left and right positions in accordance with the position of the piston 54. That is, after the valve spool 170 has been initially shifted to the left, its reciprocation thereafter is controlled by the movement of the piston 54.

When the control valve means 60 is moved to a position in its first range of "on" positions, the pressurized fluid against the right side of the piston 176 in concert with the compression spring 180 rapidly shifts the spool valve 170 toward the left to its position shown in FIG. 3. This movement is permitted since the control valve spool 126 has been moved toward the left and out of abutting engagement with the left end of the land 173 of the valve spool 170. When the valve spool 170 has been shifted to its extreme left position, as shown in FIG. 3, the land 174 blocks communication between the port 158 and the port 161 so as to block communication between the head end chamber 56 of the wiper motor 24 and the drain 163. However, when the valve spool 170 is in its extreme left position the passage 175 communicates pressurized fluid to port 158 from port 215 in the housing 160 which is connected with the conduit 150. The pressurized fluid from port 158 then flows via conduit means 157, port 169 in the loiter valve means 168, port 166 thereof, conduit 165, port 164, to the head end chamber 56. This pressurizes the head end chamber 56 and since the piston 54 adjacent the head end chamber has a larger area than adjacent the rod end chamber 58, the piston 54 is caused to be moved toward the right from its parked position toward its outboard position. Pressurized fluid from port 158 also flows via conduit 157, restriction 156 to port 146 to begin pressurizing the chamber at the left end of valve spool 170. The pressure on the left end of valve spool 170 is not sufficient by itself, however, to shift the valve spool 170 toward the right in opposition to the pressure on the right side of piston 176 and the biasing force of the compression spring 180.

When the piston 54 reaches its outboard position, as shown in FIG. 4, the valve spool 170 is shifted toward the right to communicate the pressurized fluid in the head end chamber 56 to drain. To this end, the piston rod 26 has an annular groove 225 formed therein intermediate its ends. The groove 225 in the piston rod 26 when the piston 54 is in its outboard position is aligned with an annular groove 226 formed within a housing portion 227 at the end of the cylinder 52. The groove 226 is in communication with an internal bore 228 in the housing 227 and through which the piston 26 is slidably received.

When the groove 225 is aligned with the groove 226 in the housing portion 227 pressurized fluid from conduit 118 is communicated to conduit 230 via now aligned grooves 226 and 225, the conduit 230 in turn being in communication with the left side of piston 176 via port 240 in the housing 124. Pressurized fluid from conduit 230 also flows via restriction 231 and conduit 232 to a sump 234, the sump 234 in turn being in communication with the sump 102. The restriction 231 is such that the pressurized fluid flowing in the conduit 230 is at a sufficient pressure along with the pressure on the left end of the valve spool 170 to effect movement of the piston 176 from its extreme left position, as shown in FIG. 3, to its extreme right position, as shown in FIG. 4, in opposition to the pressure on the right side of piston 176 and the biasing force of the compression spring 180.

When the spool valve 170 is shifted from its extreme left position, as shown in FIG. 3, to its extreme right position, as shown in FIG. 4, it connects the head end chamber 56 of the wiper motor 24 to drain through ports 158 and 161, the drain from the head end chamber being through the ports 166 and 169 of the loiter valve means 168 and through port 210, conduit 212, and ports 147 and 146. When the head end chamber 56 of the wiper motor 24 is connected to drain to the sump 163 in response to movement of the valve spool 170 to its extreme right position, as shown in FIG. 4, the pressurized fluid in conduit 150 is directed solely to the rod end chamber 58 of the wiper motor 24, since the land 173 of the valve spool 170 now blocks communication between ports 215 and 158. This causes the piston 54 to be moved from its outboard position, as shown in FIG. 4 toward its inboard position, as shown in FIG. 3. Although the spring 180 moves the piston 176 toward the left as the piston 54 is being moved toward its inboard position this movement is very slow since the fluid displaced from the left side of the piston 176 has to flow through the restriction 231, which restriction maintains a sufficient back pressure to insure that the piston 54 is moved through its stroke prior to the valve 170 being shifted sufficiently to the left to connect the head end chamber 56 to pressure.

As the piston 54 reaches its inboard position, as shown in FIG. 3, it uncovers port 210. The uncovering of port 210 communicates the pressurized fluid in the rod end chamber 58 of the wiper motor 24 via conduit means 212 to the right side of the piston 176. This will cause the valve spool 170 to be rapidly shifted to its extreme left position, as shown in FIG. 3, in which it again subjects the head end chamber 56 of the wiper motor 24 to pressure.

From the foregoing description, it should be apparent that when the manual control valve means 60 is in its off position, as shown in FIG. 2, that pressurized hydraulic fluid is communicated through ports 122 and 145 in housing 124 of the control valve means 60 to the rod end chamber 58 of the wiper motor 24. This pressurizes the rod end chamber 58 and biasingly holds the piston 54 in its extreme left or parked position. Although the pressurized fluid in the rod end chamber 58, when the piston 54 is in its parked position, is communicated to the sump 163 via port 154, ports 147 and 146, and ports 158 and 161, the restriction 156 provides sufficient back pressure on the hydraulic fluid so that the latter retains the piston 54 in its parked position. Also it should be apparent that the pressurized fluid in the rod end chamber 58 is communicated via port 210 and port 214 to the right side of the piston 176 of the valve spool 170 of the reversing valve means 65, but that the valve spool 170 of the reversing valve means 65 is held against movement due to the abutting engagement between the rod 190 and the left end of the land 173.

When it is desired to continuously operate the wipers 15, the operator will release the detent means 191 and move the lever 140 to effect movement of the control valve spool 126 toward the left from its off position, as shown in FIG. 2, to a position in its first range of "on" positions, such as the position shown in FIG. 3. When in this position the tapered portion 132a of the land 132 throttles the flow of hydraulic fluid from conduit means 118 to the conduit means 150. By varying the position of the tapered portion 132a of the land 132 with respect to the port 122, the extent of the communication between the ports 122 and 145 can be varied and hence the rate of flow of pressurized fluid to the conduit 150 can be varied. This enables the speed at which the piston is reciprocated to be varied, which in turn enables the wiper speed to be varied.

When the valve spool 126 is moved to the left to the position shown in FIG. 3, the compression spring 180 and the fluid pressure acting on the right side of the piston 176 will immediately move the valve spool 170 toward the left, since the latter is no longer held against movement as a result of abutting engagement between the rod 190 and the land 173. When the valve spool 170 has been moved to its extreme left position, as shown in FIG. 3, the land 173 blocks communication between the ports 147 and 146 and thus, blocks communication between the rod end chamber 58 and the sump 163 through ports 147 and 146. At the same time the land 173 blocks communication between the port 158 and the port 161 to block the drain connection between the head end chamber 56 of the wiper motor and the sump 163, and the land 173 uncovers port 215 to communicate port 215 to port 158. When port 215 is in communication through passage 175 to port 158, pressurized hydraulic fluid from conduit 150 is supplied to the conduit 157, port 169 of the loiter valve means 168, port 164, conduit 165, port 165 to the head end chamber 56 of the wiper motor 24. When the head end chamber 56 is connected to pressure the piston 54 is caused to be moved toward the right from its parked position, as shown in FIG. 2 to its inboard position, as shown in FIG. 3, and then from its inboard position to its outboard position, as shown in FIG. 4. As the piston 54 moves toward the right it uncovers ports 154 and 210 in the cylinder 52, but the uncovering of these ports has no present effect, since the land 173 of the valve spool 170 blocks communication between ports 147 and 146 and the right side of the piston 176 is already pressurized.

Movement of the piston 54 from its inboard position to its outboard position effects movement of the wipers 15 from their inboard position to their outboard position, and in a manner hereinbefore described. When the piston 54 reaches its outboard position the groove 225 will be in communication with the groove 226. When this occurs the pressurized fluid is communicated from conduit 102, grooves 225 and 226 and then via the conduit 230 and the restriction 231 to the sump 234. Also, fluid in conduit 230 flows to port 240 exposed to the left side of the piston 176. This will cause a shifting of the valve spool 170 from its extreme left position, as shown in FIG. 3, to its right position, as shown in FIG. 4, in opposition to the biasing force of the spring 180. This movement is effected because the right and left ends of the lands 173 and 174 are of an equal area, the right side of the piston 176 is in communication with the head end chamber 56 of the wiper motor 24 at this point and since the conduit 230 is now connected to pressure.

When the valve spool 170 of the reversing valve means 65 is moved to its extreme right position, as shown in FIG. 4, the head end chamber 56 of the wiper motor 24 is connected to drain to the sump 163 since the groove 175 is aligned with the ports 158 and 161. When the head end chamber 56 is connected to drain the continuously pressurized fluid in the rod end chamber 58 will cause the piston 54 to be moved from its outboard position toward its inboard position, which in turn will effect movement of the wipers from their outboard position to their inboard position.

As the piston 54 reaches its inboard position it uncovers port 210 in the cylinder 52. The uncovering of port 210 causes pressurized fluid from the rod end chamber 58 to be communicated via conduit 212 to the port 214 exposed to the right side of the piston 176. This in concert with the compression spring 180 will cause the valve spool 170 to be shifted toward the left to its position shown in FIG. 3. When the valve spool 170 is again in its extreme left position it will connect the head end chamber 56 with the pressurized fluid to again effect movement of the piston toward the right from its inboard position toward its outboard position.

As long as the manual control valve means is in a position in its first range of "on" positions, the piston 54 of the wiper motor 24 will be caused to be reciprocated back and forth to effect continuous wiping operation. The speed of the wiper operation can be varied by adjusting the position of the tapered portion 132a of the land 132 relative to the ports 122 and 145 to vary the rate at which the hydraulic fluid is supplied to the wiper motor 24.

It should be noted at this point that the reversal of movement of the piston 54 when it reaches its outboard position, as shown in FIG. 4, is very rapid since the rod end chamber 58 is always pressurized. However, at its inboard position, a slight delay or hesitation takes place before the piston 54 movement is reversed. This slight hesitation takes place as a result of the slight time delay required to again build-up pressure in the head end chamber 56 sufficient to overcome the pressure in the rod end chamber 58 and the load imposed on the wiper motor 24 by the wipers 15, as well as due to the time required to shift the valve spool 170.

The hesitation interval will vary inversely with the speed setting of the manual control valve means 60, that is, the time interval required to repressurize the head end chamber 56 and effect a shifting of the valve spool 170 of the wiper motor 24 will increase as the flow through port 145 is throttled by the tapered portion 132a of the land 132. This hesitation interval tends to preclude blade chattering at low speed settings, since the wipers move at a greater velocity as they approach their inboard position due to the head end chamber being connected to drain than would be normal for such a speed setting if the head end chamber was in the process of being pressurized as the piston approaches its inboard position. The hesitation between cycles is graphically depicted in FIG. 7 and only occurs at the inboard stroke end position of the piston 54.

In accordance with the provisions of the present invention, the hydraulic actuating system includes a pulse control means 70 which is operable to effect intermittent cyclic operation of the piston 54 with intervening dwell periods when the valve spool 126 of the control valve means 60 is moved to a position in its second range of "on" positions. This enables the operator of the vehicle, when certain driving conditions are encountered, such as light rain, to effect pulse operation of the wipers 15. During pulse operation the wipers 15 will be moved through one cycle of operation and then stopped for a predetermined time period, and then automatically moved through another cycle of operation.

The pulse control means 70 broadly comprises the loiter valve means 168 which is operable to intermittently communicate the head end chamber 56 of the wiper motor 24 with the reversing valve means 65 and a pulse delay valve means 250 for controlling operation of the loiter valve means 168. The housing 167 of the loiter valve means 168 has a cylindrical bore 251 therein which slidably receives a valve spool 252. The valve spool 252 has a pair of spaced equal diameter lands 253 and 254.

The valve spool 252 is movable between a normal or first position, as shown in FIG. 2, and a second position, as shown in FIG. 5. When the valve spool 252 is in its normal or leftmost position the land 253 unblocks port 169 to communicate port 169 with the port 166 via the annular groove 255 between the lands 253 and 254 and blocks communication between a port 260 in the housing 167 and a port 261 in the housing 167. The port 260 is in communication with the conduit 155 and the port 261 is in communication with a conduit 262, the conduit 262 in turn being in communication with a sump 263. The sump 263 is connected with the sump 102.

When the valve spool 252 is in its second or rightmost position, as shown in FIG. 5, the land 253 blocks communication between the ports 169 and 166 and the land 254 is positioned such that ports 260 and 261 are uncovered and in communication with each other via the annular groove 255.

The valve spool 252 is normally biased toward its first position, as shown in FIG. 2, by a compression spring 270. The compression spring 270 is disposed in a chamber 271 to the right of the land 254 and has one end in abutting engagement with the right end of the land 254 and the other end in abutting engagement with the housing 203.

The valve spool 252 of the loiter valve means 168 is in its first or leftmost position, as shown in FIGS. 2–4, when the manual control valve means 60 is either in its "off" position or in its first range of "on" positions. Thus, the loiter valve means 168 provides no control function during continuous operation of the wipers 15 other than to provide a passage for hydraulic fluid therethrough to the head end chamber 56.

Figures 6, 7:
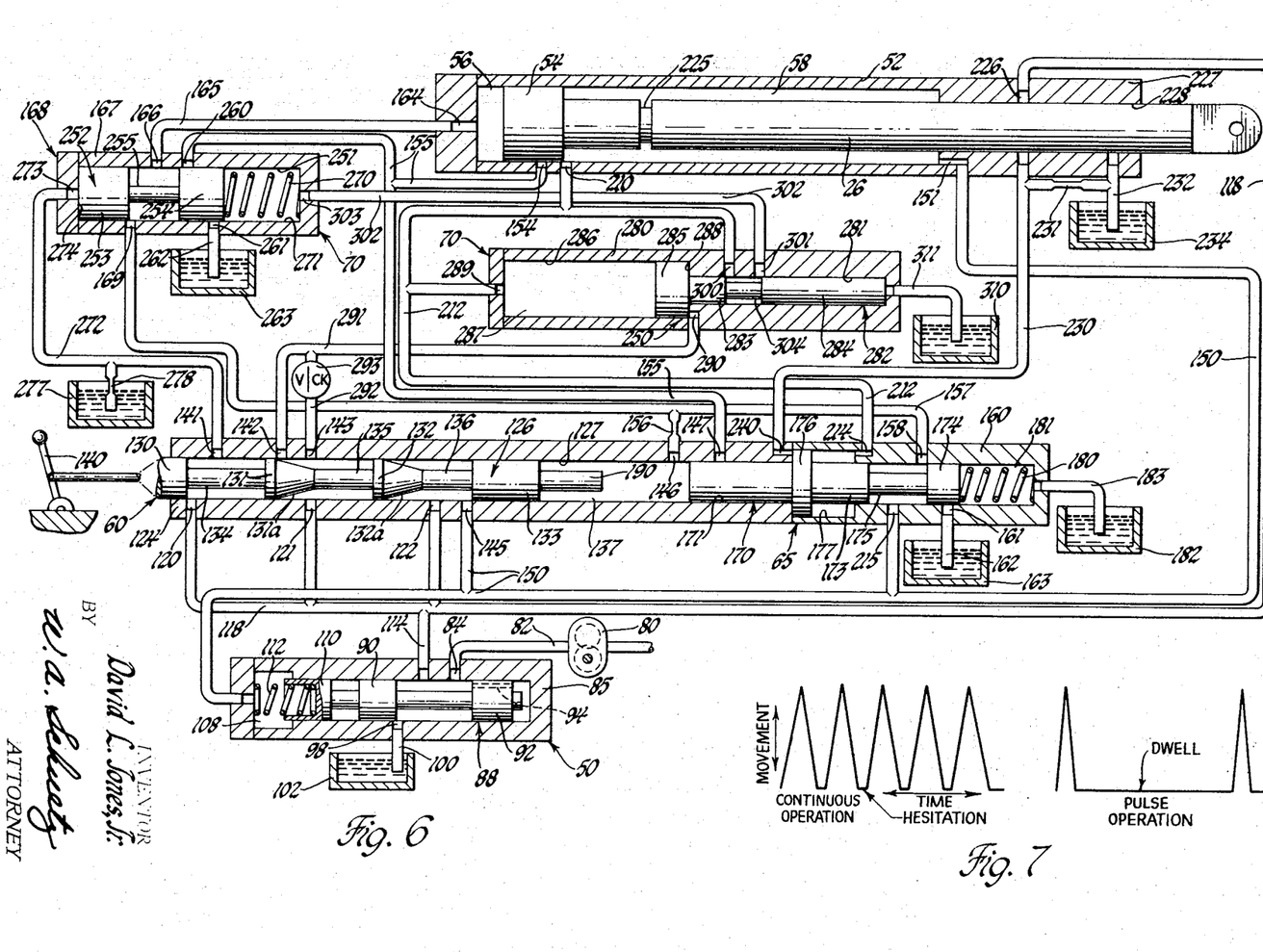
FIG. 6 is a schematic view similar to FIG. 5 but showing the relative position of the parts at the end of the dwell period.
FIG. 7 is a graph depicting wiper movement versus time for the different modes of operation of the hydraulic wiper system.

When the valve spool 126 of the control valve means 60 is moved to a position in its second range of "on" positions, as shown in FIG. 5, the valve spool 252 of the loiter valve means 168 will be biased towards its second or rightmost position in opposition to the biasing force of the spring 270. To this end, when the valve spool 126 is in the position shown in FIG. 5 fluid from conduit 118 is communicated via port 120, annular groove 134, port 141, conduit 272, port 273 in housing 167 to a chamber 274 at the left end of the land 253. Fluid is also communicated from conduit 272 to a sump 277 via a restriction 278, the sump 277 in turn being connected to the sump 102. The pressure of the pressurized fluid communicated to the chamber 274 is sufficient to move the valve spool 252 from its leftmost position, as shown in FIG. 5, to its rightmost position, as shown in FIG. 6, in opposition to the biasing force of the spring 270. Thus, during the pulse mode of operation the valve spool 252 of the loiter valve means 168 is normally biased so as to interrupt communication between the head end chamber 56 of the wiper motor 24 and the reversing valve means 65.

The pulse delay valve means 250 is operable to intermittently effect movement of the valve spool 252 of the loiter valve means 168 between its positions to effect a cycle of operation of the piston 54. The pulse delay valve means 250 comprises a housing or cylinder 280 having a cylindrical bore 281 which slidably receives a valve spool 282. The valve spool 282 has a pair of spaced lands 283 and 284 and with the land 283 at its left end including an enlarged piston or piston portion 285 which is slidably received within a larger diameter portion 286 of the bore 281. The piston 285 divides the enlarged diameter bore portion 286 into head end and rod or spool end chambers 287 and 288, respectively. The head end chamber 287 has a port 289 which is in communication with the conduit means 212. The spool or rod end chamber 288 is in communication with a conduit 291 via port 290, the conduit 291 in turn being in communication with the port 142. The conduit 291 also connected to a conduit 292 across a one-way check valve 293, the conduit 292 in turn being connected to the port 143.

The conduit 212 is also connected to a port 300 in the valve housing 280 and a port 301 in the valve housing 280 is connected via conduit 302 and port 303 in housing 167 to the chamber 271 containing the spring 270 of the loiter valve means 168. The right end of the bore 281 in the housing 280 is connected to a sump 310 via conduit 311, the sump 310 in turn being connected to the sump 102.

When the valve spool 280 of the pulse delay valve means 250 is in its leftmost position, as shown in FIG. 5, the land 284 blocks communication between the ports 300 and 301 and when its rightmost position, as shown in FIG. 6, the annular groove 304 between the lands 283 and 284 communicates the ports 300 and 301. When communication between the ports 300 and 301 is blocked the pressurized fluid in the chamber 273 is effective to hold the loiter valve spool 252 in its rightmost position in opposition to the biasing forces of the spring 270. When the valve spool 280 is in its rightmost position it communicates the ports 300 and 301 pressurized fluid from the rod end chamber 58 of the wiper motor 24 is directed to the chamber 271 containing the spring 270 and this pressure in concert with the biasing force of the spring is effective to move the valve spool 252 of the loiter valve means 168 towards its leftmost position.

When the piston 54 of the wiper motor 24 is in its parked position, as shown in FIG. 2, and pulse operation of the wiper system is desired, the operator will release the detent means 191 and manipulate the lever 140 to move the valve spool 126 of the control valve means 60 to a position in the second range of "on" positions, as shown in FIG. 5. It should be noted that when the piston 54 is in its parked position that the valve spool 280 of the pulse delay valve means 250 is in its extreme right position since the chamber 287 at the left side of the piston 285 is in communication with the rod end chamber 58 of the wiper motor 24 and that the loiter valve spool 252 is in its extreme left position due to the biasing force of the spring 270 and the fact that the chamber 271 is in communication with the rod end chamber 58 of the wiper motor 24 through the ports 300 and 301. Also, in this position the head end chamber 56 of the wiper motor 24 is connected to drain via ports 166 and 169 in the loiter valve means 168 and ports 158 and 161 in the reversing valve means 65.

Movement of the valve spool 126 of the control valve means 60 to a position in the second range of "on" positions allows the valve spool 170 of the reversing valve means 65 to be moved from its rightmost position, shown in FIG. 2, to its leftmost position, as shown in FIG. 6. This movement is effected as a result of the rod 190 disengaging the left end of the land 173 and due to the fact that the right side of the piston 176 is in communication with the pressurized fluid in the rod end chamber 58. Movement of the valve spool means 170 toward the left causes the land 174 to block communication between the ports 158 and 161 to disconnect the head end chamber 56 to drain and the land 173 to unblock the communication between ports 215 and 158 to connect the head end chamber 56 to pressure. It should be pointed out at this time that when the valve spool 126 is moved to a position in the second range of "on" positions the chamber 273 at the left end of the loiter valve spool 252 is pressurized since inlet port 120 and port 141 of the manual control valve means 60 are now in communication with each other. However, even though the left end chamber 273 is pressurized no movement of the loiter valve spool 252 toward the right is presently experienced, since the combined pressure exerted by the spring 270 and the pressure fluid in the chamber 271 is of a greater value.

When the head end chamber 56 is subjected to pressure the piston 54 is moved from its parked position to its inboard position, as shown in FIG. 3, and then to its outboard position, as shown in FIG. 4. During this movement, the valve spool 252 of the loiter valve means 168 and the valve spool 280 of the pulse delay valve means 250 remain in the positions shown in FIG. 2, since the chambers 271 and 289 remain pressurized, since they are now in communication with the pressurized fluid in the head end chamber 56 of the wiper motor 24.

When the piston 54 reaches its outboard position, as shown in FIG. 4, the groove 225 will be aligned with the groove 226 in the housing 227 and pressurized fluid from conduit 102 will flow via grooves 225 and 226 to the conduit 230. When this occurs, the left face of the piston 176 will be subjected to the pressure in the conduit 230 and cause the valve spool 170 of the reversing valve means 65 to shift from its leftmost position to its rightmost position, and for reasons hereinbefore described. When this occurs, the land 173 of the valve spool 170 blocks communication between the ports 215 and 158 to block communication between the pressurized hydraulic fluid in conduit 118 and the head end chamber 56 and the land 174 unblocks communication between the ports 158 and 161 to connect the head end chamber 56 to drain, the drain circuit being through ports 166 and 169 of the loiter valve means 168. When the head end chamber 56 is subjected to drain the pressure fluid in the chamber 290 on the right side of the piston 285 will cause the valve 280 of the pulse delay means to be moved rapidly from its rightmost position, as shown in FIG. 6, to its leftmost position, as shown in FIG. 5. This movement is now effected because the chamber 287 is subjected to drain, since it is presently in communication with the head end chamber 56. As the valve spool 280 moves toward the left the land 284 blocks communication between the ports 300 and 301. When this occurs the pressurized fluid in the chamber 273 in the left end of the loiter valve spool 252 effects movement of the loiter valve spool 252 from its leftmost position, as shown in FIG. 6, to its rightmost position, as shown in FIG. 5, this movement being permitted since the chamber 271 is subjected to drain through ports 300 and 301 when the head end chamber of the wiper motor is subjected to drain. When the loiter valve spool 252 is moved to its rightmost position, as shown in FIG. 5, the land 253 blocks communication between the ports 166 and 169 to disconnect the drain passage therethrough to the sump 163, but the land 254 unblocks communication between the ports 260 and 261 to connect the head end chamber 56 via port 154 to drain to the sump 263.

The piston 54 is moved from its outboard position toward its inboard position as a result of the valve spool 170 as the reversing valve means 65 being shifted to its rightmost position. As the piston 54 approaches its inboard position, as shown in FIG. 3, it uncovers the port 210 and thereby connects the right side of the piston 176 to the rod end chamber 58 of the wiper motor to cause the valve spool 170 to be shifted from its rightmost position toward its leftmost position. Movement of the valve spool 170 to its leftmost position causes the land 174 to block communication between the ports 158 and 161 to the sump 163 and thereby block this drain connection for the head end chamber 56 and the land 173 unblocks communication between ports 215 and 158 to connect the port 158 to pressurized hydraulic fluid. However, since the valve spool 252 of the loiter valve means 168 is now in its rightmost position, in which the ports 166 and 169 are blocked by the land 253, pressurized fluid from the port 158 cannot flow through the loiter valve means 168 and thus, the piston will be held in its inboard position by the pressurized fluid in the rod end chamber 58. As the piston approaches and when in its inboard position it covers port 154 to block communication between both the head end chamber 56 and the rod end chamber 58 and the sump 263.

Also, as the piston approaches its inboard position, it uncovers port 210 to communicate the chamber 287 of the pulse delay valve means 250 to the pressurized fluid in the rod end chamber 58. This causes the valve spool 280 of the pulse delay valve means to be moved toward the right. This movement toward the right, however, is at a slow rate, since the chamber 288 on the right side of the piston 285 is connected with pressurized hydraulic fluid from the source via ports 121 and 142. This movement to the right occurs, however, as a result of the differential area on the opposite sides of the piston 285.

The rate at which the valve spool 280 is moved toward the right is controlled by the relative position of the tapered portion 131a of the land 131 and the port 142. The fluid expelled from the chamber 288 is forced via port 290 through conduit 291, port 142, the throttled or restricted passage provided by the tapered portion 131a to the port 121 and back to the pressure regulating valve means 50. The fluid cannot be forced through conduit 292 due to the provision of the check valve 293. The rate of movement of the valve spool 280 can be varied by adjusting the position of the land 131 of the valve spool 126 relative to the port 142.

The time it takes the valve spool 280 of the pulse delay valve means 250 to move from its leftmost position towards its rightmost position is the dwell time between the cycles of operation of the wipers 15. When the valve spool 280 reaches its rightmost position the ports 300 and 301 are placed in communication with each other by the groove 304 between the lands 283 and 284. When this occurs pressurized fluid from the rod end chamber 58 is conducted to the chamber 271, which fluid in conjunction with the compression spring 270 causes the loiter valve spool 252 to be moved from its rightmost position to its leftmost position in which it again places ports 166 and 169 in communication with each other and subjects the head end chamber 56 to pressure. The fluid displaced from chamber 274 during this movement flows via restriction 278 to the sump 277. When the head end chamber 56 is again subjected to pressure, the next cycle of operation of the wiper motor 24 is initiated.

From the foregoing, it should be apparent that the pulse control means provides a simple and highly practical control arrangement which is selectively operable to effect a pulse mode of operation for a wiper motor which is operated by alternately subjecting one end thereof to pressure and drain. The pulse control arrangement is such that the loiter valve spool 252 of the loiter valve means 168 is always biased toward its leftmost position in which it communicates ports 166 and 169 when the manual control valve means 60 is either in its off position or in its first range of "on" positions so as to not interfere with continuous operation of the wipers 15. Although the valve spool 280 of the pulse delay means 250 is reciprocated during continuous operation of the wiper 15, it does not function to move the loiter valve spool 252 during continuous operation, since the left end chamber 273 of the loiter valve means is never subjected to pressure during continuous operation due to provision of the land 130 in the manual control valve spool 126.

It should be noted that the dwell period between successive intermittent cycles of operation of the wiper motor 24 is a deliberate dwell or rest period which is for a much longer duration of time than the inherent slight hesitation period which occurs during continuous operation of the wiper motor 24. This difference is depicted in the graph in FIG. 7, wherein it shows that the dwell period is for a much longer period of time than the inherent hesitation period.

From the foregoing, it should be apparent that when the manual control valve means 60 is moved to its off position after either continuous or pulse operation of the wipers 15 that the piston 54 is automatically moved to its parked position, since the rod end chamber 58 of the wiper motor 24 is always subjected to pressurized fluid and since the head end chamber 56 of the wiper motor is always subjected to drain to the sump 163 when the control valve means is in its off position.

Although the illustrated embodiment thereof has been described in great detail, it should be apparent that certain modifications, changes, and adaptations may be made in the illustrated embodiment, and that it is intended to cover all such modifications, changes and adaptations which come within the scope of the appended claims.

I claim:

1. A hydraulically operated windshield wiper actuating system which is selectively operable to either effect continuous operation of a windshield wiper or to effect intermittent operation of the windshield wiper with intervening dwell periods comprising: a source of hydraulic fluid under pressure; a wiper motor having a cylinder and a reciprocable piston disposed in the cylinder and which is adapted to be connected with the wiper, said piston dividing the cylinder into opposed chambers and having unequal areas exposed to the chambers; a manual control valve means movable between an "off" position, a first "on" position in which it effects continuous operation of the windshield wiper and a second "on" position in which it effects intermittent operation of the windshield wiper, said manual control valve means being operable to communicate said source to the motor chamber exposed to the smaller piston area to continuously pressurize the same when moved to either of said "on" positions, a reversing valve means controlled by piston movement to alternately subject the other motor chamber to pressure and drain to reciprocate said piston throughout a running stroke, and second control valve means for controlling communication between said reversing valve means and said wiper motor, said second control means being operable to continuously communicate said reversing valve means with said other chamber of said wiper motor when the manual control valve means is in its first "on" position and being operable to intermittently communicate said reversing valve means with said other chamber of said wiper motor to intermittently effect reciprocation of said piston when said manual control valve means is moved to its second "on" position.

2. A hydraulically operated windshield wiper actuating system which is selectively operable to either effect continuous operation of a windshield wiper or to effect intermittent cyclic operation of the windshield wiper with intervening dwell periods comprising: a source of hydraulic fluid under pressure; a wiper motor having a cylinder and a reciprocable piston disposed in the cylinder and which is adapted to be connected with the wiper, said piston being movable from a first position to a second position and back to the first position during each cycle of operation, said piston dividing the cylinder into opposed chambers and having unequal areas exposed to the chambers; a manual control valve means movable between an "off" position, a first "on" position in which it effects continuous operation of the windshield wiper and a second "on" position in which it effects intermittent operation of the windshield wiper, said manual control valve means being operable to communicate said source to the motor chamber exposed to the smaller piston area to continuously pressurize the same when moved to either of said "on" positions, a reversing valve means controlled by piston movement to alternately subject the other motor chamber to pressure and drain to reciprocate said piston through its cycle of operation, and second control means for controlling communication between said reversing valve means and said wiper motor, said second control means including a loiter valve which is normally biased toward a first position in which it communicates said reversing valve means with the other chamber of said wiper motor when said manual control valve means is in its first "on" position and which is biased toward a second position in which it blocks communication between said reversing valve means and said other chamber of said wiper motor in response to movement of said manual control means to its second "on" position, and delay valve means controlled by piston movement for intermittently effecting movement of said loiter valve from its second position toward its first position to effect movement of said piston through one cycle of operation and then effect movement of said loiter valve from its first position toward its second position and to hold the latter in the second position for a predetermined time period.

3. A hydraulically operated windshield wiper actuating system which is selectively operable to either effect continuous operation of a windshield wiper or to effect intermittent cyclic operation of the windshield wiper with intervening dwell periods comprising: a source of hydraulic fluid under pressure; a wiper motor having a cylinder and a reciprocable actuator piston disposed in the cylinder and which is adapted to be connected with the wiper, said actuator piston being movable from a first position during each cycle of running operation, said actuator piston dividing the cylinder into opposed chambers and having unequal areas exposed to the chambers; a manual control valve means movable between an "off" position, a first range of "on" positions in which it effects continuous operation of the windshield wiper and a second range of "on" positions in which it effects intermittent cyclic operation of the windshield wiper, said manual control valve means being operable to communicate said source to the motor chamber exposed to the smaller piston area to continuously pressurize the same when moved to either of said positions, said manual control valve means including a first valve member for throttling the flow of hydraulic fluid toward said wiper motor when in said first range of "on" positions, a reversing valve means controlled by piston movement to alternately subject the other motor chamber exposed to the large piston area to pressure and drain to cause said piston to be moved through its cycle of operation, and second control means operable to continuously communicate said other chamber of said motor with the reversing valve means when said manual control valve means is in a position in its first range of "on" positions and which is operable to intermittently communicate said other chamber of said wiper motor with said reversing valve means to intermittently move said piston through its cycle of operation when said manual control valve means is moved to a position in its second range of "on" positions, said second control means including a loiter valve means having a reciprocable valve element movable between a first position in which it communicates said reversing valve means with said other chamber of said wiper motor and a second position in which it blocks communication therebetween, biasing means effective on one end of said valve element to bias the same toward its first position, said first control valve means when moved to its second range of "on" positions communicating the opposite end of said valve element of said loiter valve with said source to move said valve element toward its second position in opposition to the biasing force of said biasing means, and delay valve means for controlling movement of said valve element of said loiter valve means when said manual control valve means is in its second range of "on" positions, said delay valve means including a reciprocable valve spool having a differential area piston disposed within a cylindrical bore and dividing the bore into opposed chambers, said valve spool being movable between a first position in which it communicates the wiper motor with said one end of said loiter valve means and a second position in which it blocks communication therebetween, said manual control valve means including a second valve member for throttling the flow of pressurized fluid from the source to the chamber adjacent the small piston area of said valve spool of said delay valve means, the other chamber of said valve spool of said delay valve means being in communication with said wiper motor, said other chamber of the delay valve means being exposed to the smaller area side of the piston of the wiper motor when the latter is in its first position so that pressurized fluid from the wiper motor causes the valve spool of the delay valve means to be moved from its second position towards its first position and with the fluid in the chamber exposed to the smaller area side of the piston of said valve spool being forced across the second valve member of said manual control valve means, the position of said second valve member of said manual control valve means determining the rate of egress of fluid from the chamber exposed to the smaller area side of the piston of said valve spool, which in turn determines the dwell period between successive cycles of operation of the wiper motor.